United States Patent Office 3,351,458
Patented Nov. 7, 1967

3,351,458
HERBICIDAL COMPOSITIONS AND PROCESSES OF CONTROLLING UNDESIRABLE PLANT SPECIES IN THE PRESENCE OF CROPS THEREWITH
Donald David Bondarenko, Trenton, N.J., assignor to American Cyanamid Company, Stamford, Conn., a corporation of Maine
No Drawing. Filed June 30, 1964, Ser. No. 379,347
8 Claims. (Cl. 71—121)

This invention relates to herbicidal compositions and to methods of controlling undesirable plant growth therewith in the presence of important economic crops. Further and more importantly, it relates to the preemergence or early postemergence control of undesirable plant growth which may be found in the presence of crops or in areas employed for crop cultivation.

While there are many known herbicides, including preemergence and postemergence types, they are in general not widely selective and thus when applied to control the growth of undesirable plant life may also destroy economically or esthetically important growth such as food crops or ornamental plants.

Further, of course, many known herbicidal materials are expensive to manufacture and thus expensive to employ where large acreages are involved and the rate of application to achieve effective results is substantial.

Accordingly, it is an object of the present invention to provide a method of controlling undesirable plant growth occurring in the presence of important economic or ornamental crops or in areas used for such crop cultivation.

It is a further and particular preferred object of this invention to provide a process for the selective preemergence control of undesirable plant growth in the presence of crops or in areas used for crop cultivation.

It is still a further object to provide a method for the selective preemergence control of undesirable plant growth, which process involves the use of highly selective preemergence herbicides, particularly with respect to both monocot and dicot weeds, and still more particularly the preemergence or early postemergence control of such weeds in cereal and grass crops such as corn, rice, sorghums and sugar cane; legume crops such as soybeans, peanuts and clovers; field crops such as cotton, okra, hemp and beans; vegetable crops such as beans, onions, potatoes and cucurbits; fruit and nut crops such as apples, peaches, almonds, cherries, walnuts, strawberries, brambles and grapes; and ornamental annual and perennial flowering plants.

In accordance with this invention, a process for controlling undesirable plant species in the presence of planted and growing crops is provided which comprises applying to the planted area to be protected from such undesirable plant growth an effective amount of a compound selected from the group consisting of those having the formula:

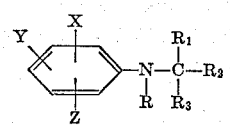

wherein X, Y and Z represent the same or different radicals selected from the group consisting of hydrogen, halogen, and in particular chlorine and bromine, lower alkyl, halolower alkyl and lower alkoxy radicals; R is selected from the group consisting of hydrogen, nitroso, and hydroxyl; and $R_1$, $R_2$ and $R_3$ are the same or different and are lower alkyl radicals and their salts.

Within the class of compounds described above, a select group exhibiting outstanding characteristics, both as to activity and selectivity, include those selected from the group consisting of those having the formula:

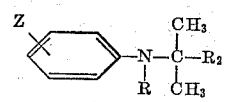

wherein Z is selected from the group consisting of halogen, lower alkyl and hydrogen and is located in the meta or para position of the benzene ring, R is selected from the group consisting of hydrogen and hydroxyl, and $R_2$ is lower alkyl and their salts.

In both the general class of compounds and the greatly preferred class of compounds represented by the above formulae, the expressions "lower alkyl" and "lower alkoxy" refer to alkyl groups of radicals containing from 1 to 4 carbon atoms such as methyl, ethyl, propyl, butyl and the like.

The preparation of representative compounds of this series where R is hydrogen is described in U.S. P. 2,692,-287, Compt. rend., 238: 1892–1894 (1954), and J. Chem. Sr., 1933: 146–151.

In general, for compounds in which R is hydrogen, the procedure involves the reaction of one mole of a salt of aniline or a substituted aniline with an excess of a tertiary alcohol in a sealed vessel at a temperature of from 100 to 250° C. for a period of time of from 2 to 24 hours according to the equation:

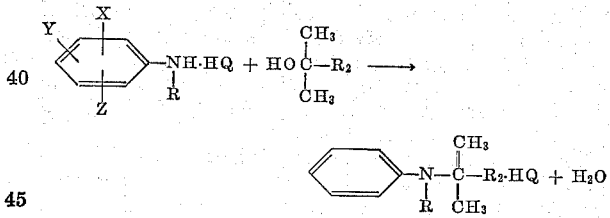

where X, Y, Z, R and $R_2$ have the meanings given above and HQ is an acid. In order to convert the salt to the free base, a suitable base such as sodium hydroxide or potassium carbonate produces the free alkylaniline.

The resulting products may be purified by recrystallization of the salts, or selective extraction, or distillation of the mixture of alkylaniline and starting aniline, or gas-liquid chromatography.

The salts may be prepared from the free alkylaniline by treatment with a suitable acid, such as anhydrous hydrogen chloride or hydrogen bromide, concentrated aqueous hydrochloric acid, glacial acetic acid, or other equivalent means, either in the presence or absence of an inert solvent, as for example diethyl ether, benzene or toluene.

N-tert-alkyl phenylhydroxylamines, which may be either substituted or unsubstituted in the phenyl ring, may be prepared by reacting the appropriate phenylhydroxyl-amine with a tert-alkyl halide, preferably tert-alkyl bromide or iodide in a suitable inert solvent, as for example benzene or methyl isobutyl ketone. The reaction is preferably carried out at a temperature of from 50 to 100° C. and is illustrated by the following equation:

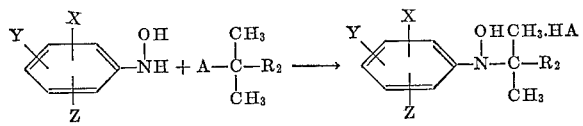

Alternatively, tert-alkylanilines where R equals both hydrogen and hydroxyl may be obtained by the procedure described in J. Am. Chem. Soc., 86, 646–650 (1964).

The following compounds are illustrative of those contemplated for use in accordance with the present invention: N-tert-butyl-m-toluidine, N - tert-butyl - m-chloroaniline, N-tert-butyl-p-anisidine, N-tert - butyl-p-chloroaniline, N - tert - butyl - m,p - dichloroaniline, N - tert-butyl-m-chloro - p - anisidine, N - tert - butyl - m,m - dichloroaniline N - (3 - methyl - 3 - pentyl)aniline, N-(2, 2,4,4 - tetramethyl - 2 - pentyl)aniline, N - tert - butylaniline, N - tert - butylaniline hydrochloride, N - tert-amylaniline and the like. Also, N - tert - butyl - 3 - chlorophenylhydroxylamine, N - tert - butyl - 3 - chlorophenylhydroxylamine hydrochloride, N - tert - amyl-4-methylphenyl - hydroxylamine, and N - tert - amyl - 4 - methylphenylhydroxylamine hydrochloride.

In carrying out the process of this invention, the control of undesirable weeds may be achieved by application of a sufficient amount of active compound to soil before the weeds emerge or at least shortly thereafter. For weed control on crop lands, the active material may be applied after the crop has been planted, but prior to emergence of the crop or weeds, or it may be applied after the crop has emerged, but prior to weed emergence. Further, weed control may be achieved by application of the active material after the crop has emerged and before the weeds have matured, but preferably shortly after their emergence.

While the amount applied is sufficient under the above circumstances to control undesirable plant growth, this term normally means that applications will be made in amounts of from about 1 to about 20 pounds per acre and normally uniformly good results are achieved with applications in the range of from about 3 and 20 pounds per acre.

With respect to the outstandingly preferred aspect of this invention, namely the use of the above class of compounds for the preemergence control of undesirable plant growth, concentrations on the order of from about 2 to about 8 pounds per acre and preferably from 3 to 5 pounds per acre are employed.

Generally, the compounds of this invention will be applied in formulations with an inert carrier, either solid or liquid, and most frequently such formulations will employ a small amount of a surface active agent. In liquid form, they may be employed as concentrates or as emulsions or dispersions or in solvent-containing solutions. Whether employed in liquid form or as wettable powders, compositions containing the compounds will normally contain from about 5 to about 95% by weight of the total composition.

If aqueous dispersions or emulsions are to be prepared or employed, those surfactants normally employed for such purposes may be utilized with the compounds of this invention. Thus, sodium alkylaryl sulfonates, sorbitol long chain fatty acid esters, the alkylaryl sulfonic acids and the like may be employed in amounts of from between 2 and 30% of the composition.

For solutions, solvents such as cyclohexanone, benzene, xylene, toluene and various other hydrocarbon petroleum distillates may be employed. The proportion of the compounds of this invention employed in a suitable solvent may vary from about 2 to about 50% or higher.

As a dry powder, compounds of this invention may be applied to finely divided carriers such as diatomaceous earth, fuller's earth, attaclay, charcoal and other known carriers, where they may constitute from between about 5 and 95% by weight of the total composition.

In application of the area to be treated, the compounds of this invention may be applied by spraying or by the use of mechanical spreaders in accordance with conventional practice. With respect to application, however, it will be noted that, depending upon the particular circumstances encountered, one method of application may be preferable over others. Thus, for example, for preferred preemergence application it has been found very satisfactory to apply the active compound in a liquid spray or on granules. In spray applications, the organic or inorganic salt of the compound is generally used, since it is usually more water-soluble than the free base. Illustratively, the hydrochloride, sulfate, nitrate, tartrate, citrate, maleate, and acetate salts may be employed. In the presence of emerged crops and on established turf, dry formulations may be preferred.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

*Example 1.—Preemergence control*

Selective preemergence control of monocotyledonous and dicotyledonous weeds in the presence of crops, such as corn, cotton, soybeans, peanuts, and snapbeans, can be achieved with the compounds of the present invention. This is demonstrated by the following tests wherein seeds of the above-identified crops and of a number of monocot and dicot weeds were thoroughly mixed with potting soil. Approximately one inch of each of the seed-soil mixtures was then placed on top of one inch of potting soil in separate pint containers and lightly tamped. These seeded containers were then sprayed with solutions of the test compounds prepared in either 50/50 acetone/water mixtures, or in water alone where the salts were applied, at concentrations calculated to deposit a predetermined amount of the test compound in each container. The amount of compound deposited in the various treatments is reported as rate per acre application. After spraying, the containers are placed on greenhouse benches and cared for in the usual manner. Two weeks after treatment the containers are examined, rated according to the Herbitoxicity Index given below, and the results are recorded. The results, reported in Table I below, demonstrate the high degree of selective preemergence activity of the compounds of the instant invention.

In Table I set forth hereinbelow, the values reported correspond to the values set forth in the Herbitoxicity Index set forth hereinbelow.

*Herbitoxicity index*

9=100% reduction in stand
9−=1 or 2 stunted plants remaining
8=85−<100% reduction in stand
7=70−<85% reduction in stand
6=60−<70% reduction in stand
5=50−<60% reduction in stand
4=40−<50% reduction in stand
3=30−<40% reduction in stand
2=20−<30% reduction in stand
1=10−<20% reduction in stand
0=No apparent effect
s=Severe injury.
m=Moderate injury.
t=Trace to slight injury.
c=Chlorotic.
a=Abnormal, malformed, twisted.

TABLE I.—PREEMERGENCE

| Treatment Structure | Rate, lbs./Acre | Jimson-weed | Kochia | Lambs-quarter | Mustard | Pig-weed | Purs-lane | Barn-yard-grass | Crab-grass | Giant Fox-tail | Green Fox-tail | Corn | Cotton | Soy-bean | Peanut | Snap-bean |
|---|---|---|---|---|---|---|---|---|---|---|---|---|---|---|---|---|
| ⌬—NH—C(CH₃)₃·HCl | 2 | 7m | 8m | 5m | 9— | 9— | 7s | 8s | 7m | 7c | 8 | 0 | 0 | tc | 0 | tc |
| ⌬—NH—C(CH₃)₃ | 2 | 9— | 8m | 7m | 8sc | 9 | 7m | 7m | 9— | 8sc | 8sc | 0 | 0 | 0 | 0 | tc |
| ⌬—N—C(CH₃)₃ / OH | 4 | — | — | 7s | 9— | 9 | — | 8sc | 9 | — | 8s | 0 | 0 | tc | — | — |
| ⌬—N—C(CH₃)₃·HCl / OH | 4 | — | — | 7s | 8m | 9— | — | 8sc | 9 | — | 8s | 0 | 0 | tc | — | — |
| ⌬—N—C(CH₃)₃·½H₂SO₄ / H | 5 | — | — | — | 9c | 9 | — | 8c | 9 | — | 9c | tc | 0 | tc | — | — |
| ⌬—N—C(CH₃)₃·CH₃COOH / H | 5 | 8mc | 9 | 9—/7m | 9c | 9 | 9 | 8c | 8c | — | 3c | 0 | 0 | 0 | 0 | — |
| Cl—⌬—NH—C(CH₃)₃ | 4/2 | 8mc/2m | — | 4t | 9—sc/9— | 9—/9 | — | 9/7sc | 5c | 8sc | 8sc/8sc | 0/0 | 0t | me/me | 0/0 | tc/tc |
| Cl—⌬—NH—C(CH₃)₃ | 5/2 | 2m | 9/7 | 4t | 8s/8mc | 9—/9— | 9 | 9—/5tc | 9/9 | 6m | 9/8sc | 0/0 | 0/0 | 0/0 | 0/0 | 0tc/tc |
| Cl—⌬—NH—C(CH₃)₃·HCl | 5/2 | 2m | — /7 | 4t/7s 8s 5m | 8m/7mc | 8/7 | — /7m | 9—/8mc | 9/6t | 7m | 9/8sc | 0/0 | 0/0 | 0/0 | 0/0 | 0tc/tc |
| CH₃—⌬—NH—C(CH₃)₃ | 5/4/2 | 6mc | — /8m | 7/8s/5m | 8m/8s/8sc | 9—/9— | — /7/8 | 6/7m/5t | 9—/9—/7 | — /7 | 7/8sc/8 | 0/0/0 | 0/0/0 | tc/0/0 | 0/0/0 | tc/tc/tc |

TABLE I—Continued

| Treatment Structure | Rate, lbs./Acre | Jimson-weed | Kochia | Lambs-quarter | Mustard | Pig-weed | Purs-lane | Barn-yard-grass | Crab-grass | Giant Fox-tail | Green Fox-tail | Corn | Cotton | Soy-bean | Peanut | Snap-bean |
|---|---|---|---|---|---|---|---|---|---|---|---|---|---|---|---|---|
| ⌬—N(—H)—C(CH₃)₂Cl₂C—COOH | 5 | | | | 9 | 9 | | 8a | 9 | | 9 | ma | 0 | ta | | |
| ⌬—N(—H)—C(CH₃)₂·½COOH COOH | 5 | 7mc | | | 9 | 9— | | mc | 8c | | 7c | tc | 0 | 0 | | |
| ⌬—N(—H)—C(CH₃)₂—·CH₂CH₂SO₃H | 5 | 4to | | | 9c | 9 | | 8c | 8c | | 7c | 0 | 0 | 0 | 0 | 0 |
| H₃C—⌬—NH—C(CH₃)₃ | 5 / 4 / 2 | | 6 | 0— / 9 / t | 9— / 9 / 8mc | 9 / 9 / 6 | 7 | 3 / 7 / 5 | 9— / 8s / 5 | 5 | 8 / 8 / 7 | 0 | 0 | 0 | 0 | 0 |
| H₃C—⌬—NH—C(CH₃)₃·HCl | 2 | | 5 | t | 7tc | 6 | 7 | 3 | 4 | 4 | 5 | 0 | 0 | 0 | 0 | 0 |
| CH₃—⌬—NH—C(CH₃)(C₂H₅)CH₃ | 5 | | | 7s | 8s | 9 | | 8s | 9 | | 8s | 0 | 0 | 0 | | |
| ⌬—N(—H)—C(CH₃)₃—⌬—COOH | 5 | | | | 9c | 9 | | mc | 5c | | 7c | 0 | 0 | tc | | |
| CH₃O—⌬—N(—H)—C(CH₃)₃·HCl | 5 | | | | mc | 7c | | 0 | 7c | | 5c | 0 | 0 | 0 | | |

Example 2

The following tests were run to determine the efficacy of both the free base and the salts of compounds of the instant invention. Employing the procedure set forth in Example 1 above, solutions of the free base and the corresponding hydrochloride salt were applied at equivalent rates to planted seeds of various monocot and dicot weeds and selected crops. Two weeks after treatment the containers of treated seeds were examined and rated according to the Herbitoxicity Index given above. The results obtained, which appear in Table II below, show that the free base and the corresponding salt exhibit essentially the same degree of selective preemergence herbicidal activity. Further, these data show that a rate exceeding 1 lb./acre of the active ingredient is required to control undesirable plant growth and, still further, they show that the compounds of the invention can be used to control both broadleaf and grass weeds in the presence of crops without injuring them.

What is claimed is:

1. A method for controlling undesirable plant species in the presence of planted and growing crops, comprising applying to the planted area a herbicidally effective amount of a compound selected from the group consisting of those having the formula:

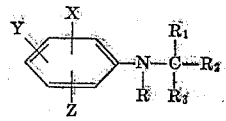

wherein X, Y and Z represent radicals selected from the group consisting of hydrogen, halogen, halolower alkyl, lower alkyl and lower alkoxy radicals; R is selected from the group consisting of hydrogen, hydroxyl and nitroso radicals; and $R_1$, $R_2$ and $R_3$ are lower alkyl and their herbicidally effective salts.

2. A method according to claim 1 wherein the com-

TABLE II.—PREEMERGENCE

| Compound | Rate, lbs./Acre | Jimsonweed | Kochia | Lambsquarter | Mustard | Pigweed | Purslane | Barnyardgrass | Crabgrass | Green Foxtail | Giant Foxtail | Corn | Cotton | Soybean | Peanut | Snapbean |
|---|---|---|---|---|---|---|---|---|---|---|---|---|---|---|---|---|
| N-tert-butylaniline | 2 | 9— | 8m | 7m | 8sc | 9 | 7m | 7m | 9— | 8sc | 8sc | 0 | 0 | 0 | 0 | tc |
| N-tert-butylaniline hydrochloride | 2 | 7m | 8m | 5m | 9— | 9— | 7s | 8s | 7m | 8 | 7c | 0 | 0 | tc | 0 | tc |
| N-tert-butyl-m-chloroaniline | 2 | 8mc | 9 | 7m | 9— | 9 | 9 | 7sc | 9 | 8sc | 8sc | 0 | t | mc | 0 | tc |
| N-tert-butyl-p-chloroaniline | 2 | 2m | 7 | t | 8mc | 9— | 7m | 5tc | 8 | 8sc | 6m | 0 | 0 | 0 | 0 | tc |
| N-tert-butyl-p-chloroaniline hydrochloride | 2 | 2m | 7 | t | 7mc | 7 | 7 | 8mc | 6t | 8sc | 7m | 0 | 0 | 0 | 0 | tc |
| N-tert-butyl-m-methylaniline | 2 | 6mc | 8m | 5m | 8sc | 9 | 8 | 5t | 7 | 8 | 7 | 0 | 0 | 0 | 0 | tc |
| N-tert-butyl-p-methylaniline | 2 | 7mc | 6 | t | 8mc | 6 | 7 | 5 | 5 | 7 | 5 | 0 | 0 | 0 | 0 | 0 |
| N-tert-butyl-p-methylaniline hydrochloride | 2 | 4tc | 5 | t | 7tc | 6 | 7 | 3 | 4 | 5 | 4 | 0 | 0 | 0 | 0 | 0 |
| N-tert-butylaniline | 1 | t | 4 | t | 5 | 7 | 7 | 7mc | 7 | 7m | 6m | 0 | 0 | 0 | 0 | 0 |
| N-tert-butylaniline hydrochloride | 1 | t | 4 | t | 4 | 6— | 6 | 7mc | 6 | 7m | 7m | 0 | 0 | 0 | 0 | tc |
| N-tert-butyl-m-chloroaniline | 1 | t | 9 | m | 5mc | 7m | 8s | 7mc | 6 | 6t | 6t | 0 | 0 | 0 | 0 | tc |
| N-tert-butyl-p-chloroaniline | 1 | t | 6 | t | 3t | 6 | 6 | 4m | 4 | 7m | 7m | 0 | 0 | 0 | 0 | tc |
| N-tert-butyl-p-chloroaniline hydrochloride | 1 | t | 5 | t | 5 | 5 | 6 | 5 | 4 | 5 | 5 | 0 | 0 | 0 | 0 | 0 |
| N-tert-butyl-m-methylaniline | 1 | t | 4 | t | t | 5 | 6 | 3t | 4 | 3 | 3 | 0 | 0 | 0 | 0 | 0 |
| N-tert-butyl-p-methylaniline | 1 | t | t | 0 | t | 3 | 5 | 0 | 3 | 3 | 5 | 0 | 0 | 0 | 0 | 0 |
| N-tert-butyl-p-methylaniline hydrochloride | 1 | t | t | 0 | 2 | 3 | 6 | 3 | 3 | 3 | 4 | 0 | 0 | 0 | 0 | 0 |

Example 3—Postemergence control

In the following postemergence tests, healthy two-week-old plants were sprayed with solutions of the N-tert-butylaniline hydrochloride prepared as in Example 2, but at rates equivalent to 20, 30, and 45 lbs./acre of active ingredient. After spraying, the treated plants were placed on greenhouse benches and cared for in the usual manner. These plants were examined daily for a period of three weeks and rated according to the Herbitoxicity Index given above. At the end of the three-week period, the tests were terminated. The results in Table III show that the compounds applied postemergence control monocot and dicot plants. Furthermore, certain crop plants, such as cotton, are resistant; therefore, by directing sprays onto weeds and away from the foliage of crop plants, postemergence and preemergence control of undesirable plants can be obtained.

TABLE III.—N-TERT-BUTYLANILINE HYDROCHLORIDE

| Rate, lbs./Acre | Kochia | Mustard | Pigweed | Barnyardgrass | Crabgrass | Green Foxtail | Wild Oats | Cotton |
|---|---|---|---|---|---|---|---|---|
| 20 | 9 | a | 9 | 9 | 9 | 9 | 9— | t |
| 30 | 9 | 9 | 9 | 9 | 9 | 9 | 9 | m |
| 45 | 9 | 9 | 9 | 9 | 9 | 9 | 9 | sc | pound is selected from the group consisting of N-tert-butylaniline and its herbicidally effective salts.

3. A method according to claim 1 wherein the compound is selected from the group consisting of N-tert-butyl-p-chloroaniline and its herbicidally effective salts.

4. A method according to claim 1 wherein the compound is selected from the group consisting of N-tert-butyl-m-chloroaniline and its herbicidally effective salts.

5. A method according to claim 1 wherein the compound is selected from the group consisting of N-tert-butyl-N-phenyl-hydroxylamine and its herbicidally effective salts.

6. A method according to claim 1 wherein the compound is selected from the group consisting of N-tert-butyl-m-methylaniline, N-tert-butyl-p-methylaniline and its herbicidally effective salts.

7. A method for the selective preemergence control of undesirable plant growth comprising applying to the soil of an area to be protected from said undesirable plant growth a herbicidally effective amount of a compound of the formula:

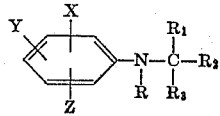

wherein X, Y and Z are radicals selected from the group consisting of hydrogen, halogen, halolower alkyl, lower alkoxy and lower alkyl radicals, R is selected from the group consisting of hydrogen, hydroxyl and nitroso radicals; and $R_1$, $R_2$ and $R_3$ are lower alkyl and their herbicidally effective salts.

8. A method for controlling undesirable plant species in the presence of planted and growing cotton comprising applying to the planted area a herbicidally effective amount of a compound selected from the group consisting of N-tert-butylaniline and its herbicidally effective salts.

References Cited

UNITED STATES PATENTS

| | | |
|---|---|---|
| 3,037,058 | 5/1962 | Bluestone et al. |
| 3,111,403 | 11/1963 | Soper _____ 71—2.3 |
| 3,219,428 | 11/1965 | Weil et al. _____ 71—2.6 |
| 3,257,190 | 6/1966 | Soper _____ 71—2.3 |

LEWIS GOTTS, *Primary Examiner.*

JAMES O. THOMAS, JR., *Examiner.*